Patented Jan. 1, 1946

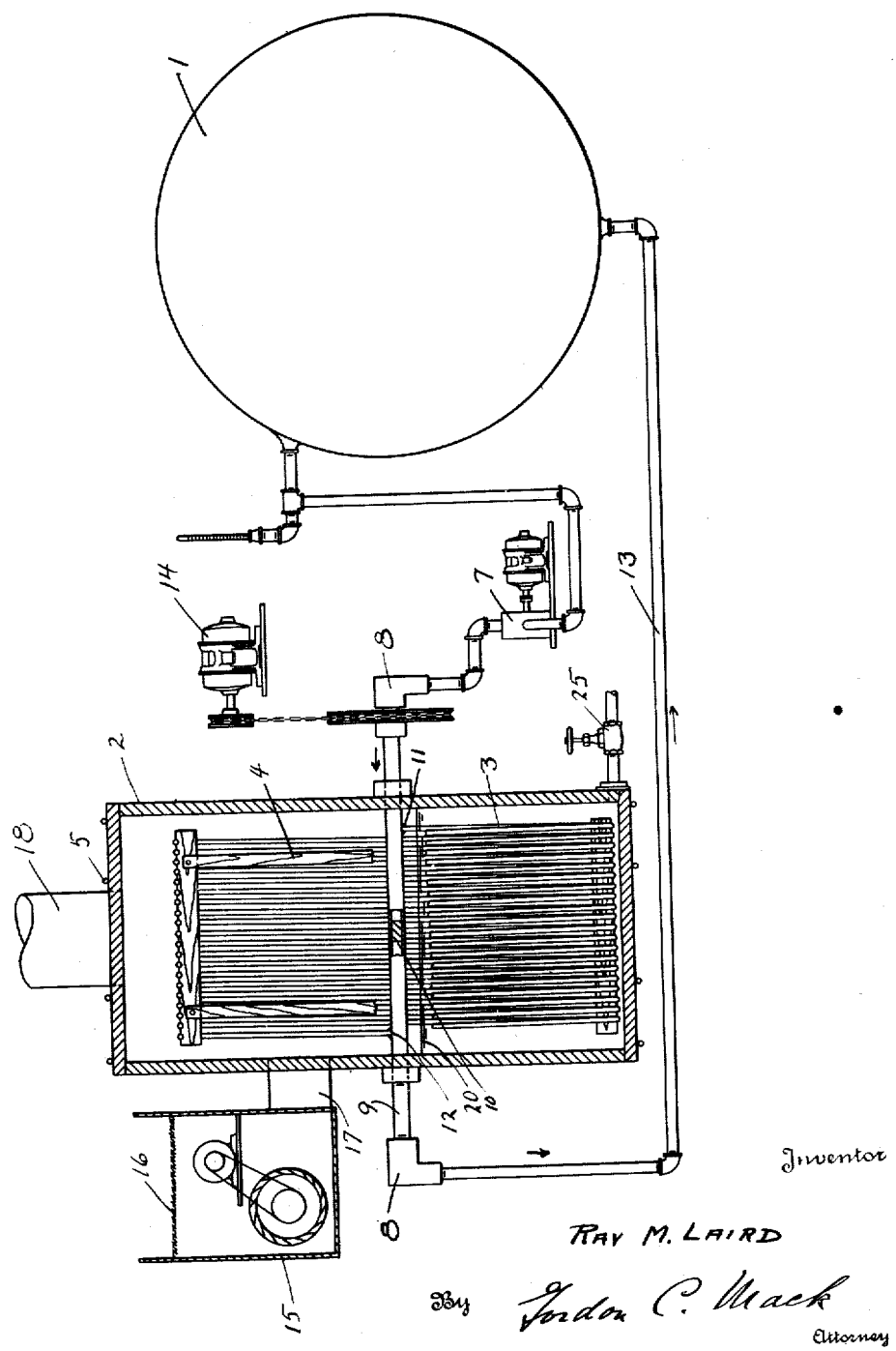

2,392,093

UNITED STATES PATENT OFFICE 2,392,093

EVAPORATION PROCESS

Ray M. Laird, Rootstown, Ohio

Application March 2, 1943, Serial No. 477,759

3 Claims. (Cl. 99—205)

This application relates to new apple products. It includes a method of concentrating apple juice and particularly for producing a heavy syrup or thick concentrate therefrom, and includes the concentrated product and a confection derived therefrom together with the method of making the same.

When apple juice is concentrated by the usual methods of evaporation it is apt to become scorched as it thickens. It has never been commercially possible to produce a very heavy concentrate without scorching. The concentrate of this invention contains over seventy-five per cent and may contain as much as eighty per cent up to ninety-five per cent or more of solids. This can easily be converted to a valuable confection or other food stuff by adding a dry material thereto, and the dry material may be added without cooking. The resulting product is free from tackiness and will not dry out even though packaged in a moisture-pervious wrapper. A delectable confection may be manufactured by merely adding dried milk; and nuts, raisins or the like may also be incorporated in the product if desired.

In producing the concentrate of this invention the apple juice is evaporated with constant agitation and with the circulation of air above the main body of the juice being concentrated while a heated surface is dipped in and out of the bath and passed through the circulating air. This heated surface is preferably in the form of a coil through which hot water is circulated, but other means may be employed. The process will be more clearly described by referring to the drawing which is an elevation partly in section of suitable means for carrying out the process.

The main elements of the apparatus comprise a hot water boiler 1 and evaporator 2. The evaporator is shown in section and the copper coil 3 within the evaporator is partly broken away to show the supporting wooden spider 4 and the water circulating means. The evaporator is made of suitable wood and is preferably cylindrical and bound by the steel tie rods 5.

The hot water used for heating the juice is drawn from the boiler by the pump 7 and is passed thence to the coil 3. The coil is supported by swing joints 8 on the holow axle 9 which is blocked at 10 in the middle so that the hot water must enter the coil from the axle through one end 11 and be discharged into the axle at the other end of the coil 12. The waste water is returned by the return line 13 to the boiler. The coil is rotated by the motor 14 through the sprocket drive shown.

Any suitable means for circulating air through the boiler may be employed. The drawing shows a fan 15 which draws air through the filter 16 and discharges it through the conduit 17 into the upper portion of the evaporator. As the air passes around the exposed portions of the heated coil the water in the film of apple juice which adheres to the coil is efficiently vaporized. The used air laden with moisture vapor is vented through the stack 18.

In operating the evaporator the apple juice is introduced through appropriate means (not shown) as for example, through an opening in the top of the evaporator. An unlimed juice may be used, although the juice is preferably first limed to remove the acids. The quantity of juice treated may vary although the evaporator may advantageously be filled to the level 20 just below the axle 9. For example, an evaporator with a vertical diameter of eight feet and about four feet from end to end, equipped with a coil seven feet in diameter formed of twenty turns of 1¼ inch copper tubing, such as illustrated in the drawing, may be charged with about 500 gallons of juice to be concentrated at one time. The heating water is advantageously kept at a temperature not over 212° F., as for example within 10 degrees of 190° F. This prevents scorching. The air blown into the evaporator may be at room temperature although it may be heated somewhat as desired. Using cold air and rotating the coil at for example, 1 to 10 R. P. M. 500 gallons of the juice will be converted to a syrup of over 75% solids content in about 5 hours.

This concentrate is liquid when hot. When cold it flows little, if at all. Little evaporation occurs from the surface of the body of the liquid, most of the evaporation being from the liquid which adheres to the exposed portions of the coil. This is never permitted to become so concentrated that it does not readily blend with the body of liquid in the evaporator when the surface to which it adheres is resubmerged. This is made possible by control of the temperature of the heating water, the rate of rotation of the coil, the volume and temperature of the air circulated through the top of the evaporator, etc. By proper coordination of these factors the solids content can be built up to over 75% and without scorching. Although thick when cold the heated concentrate is quite liquid. It is hottest on the coil just before submersion. Consequently the thickest concentrate which is that on the coil just before it is resubmerged in the body of concentrate, readily blends with the body of concentrate as the coil moves through it. This prevents the formation of any heavy film of overconcentrated deposit on the coil. Furthermore, the movement of the coil through the body of concentrate agitates it and keeps its composition substantially uniform.

The concentrate may be drawn off through the outlet 25 while hot or after cooling it may be dug out of the bottom of the evaporator or scraped through a suitable opening in the side.

This concentrate contains valuable food stuffs including levulose, sugar, etc. It has a good, scorch-free flavor. It is readily converted into a food stuff which is more easily handled by adding to it a dry material which absorbs the liquid of the concentrate and blends with it to form a homogeneous mass of lower moisture content which is solid and is preferably of such low water content that it is free from objectionable tackiness. A confection may readily be made by adding powdered milk (either skimmed or whole milk) in any suitable amount. The concentrate and powdered milk may be mixed in equal amounts on the amount of milk may be half the amount of concentrate or may be twice the amount of concentrate. The quantity of milk added will depend upon the solids content of the concentrate and the moisture content desired in the finished product. Eggs, in powdered form, may be added to enrich the product. Nuts, raisins, chocolate, cocoa, etc. may be added to make a fancy candy but this is not necessary. Cooking the concentrate and powdered milk gives an "off" flavor to the product which can be avoided by mixing the concentrate and powdered milk without cooking them. To do this the concentrate may be heated to a temperature not over 212° F. to make it liquid and the powdered milk may be gradually stirred into it. The milk may advantageously be heated before being added to the concentrate so as not to chill it, or heat may be supplied to the concentrate as the powdered milk is stirred into it.

I claim:

1. The method of concentrating apple juice to produce a concentrate with a solids content of over seventy-five percent which comprises rotating a coil partially submerged therein on a horizontal axis, maintaining the temperature of the coil at about 190° F. and circulating air over the unsubmerged portion of the coil to hasten the evaporation of moisture from juice which adheres to the coil and rotating the coil at such a speed that no over-concentrated deposit forms on the coil.

2. The method of concentrating apple juice which comprises rotating a coil partially submerged therein on a horizontal axis, maintaining the temperature of the coil at about 190° F. and circulating air over the unsubmerged portion of the coil to hasten the evaporation of moisture from juice which adheres to the coil and rotating the coil at such a speed that no over-concentrated deposit forms on the coil and thus continuing the evaporation of water from the juice until it reaches a solids content of over seventy-five per cent.

3. The method of producing a concentrate from apple juice which comprises liming the juice and then concentrating the juice by dipping a heated surface into a body of the juice, removing it therefrom, circulating air around the heated surface while not submerged in the body of the juice to hasten evaporation of water therefrom, then moving the heated surface through the body of the juice to agitate the body of the juice and disperse the concentrated film on the surface with the body of the juice, then removing the heated surface and repeating the operation until the concentration of the body of the juice exceeds a solids content of seventy-five per cent and preventing scorching by not heating the surface to a temperature in excess of 212° F.

RAY M. LAIRD.

CERTIFICATE OF CORRECTION.

Patent No. 2,392,093.   January 1, 1946.

RAY M. LAIRD.

It is hereby certified that error appears in the printed specification of the above numbered patent requiring correction as follows: Page 1, first column, line 50, for "holow" read --hollow--; page 2, first column, line 26, for "on" after "amounts" read --or--; and that the said Letters Patent should be read with this correction therein that the same may conform to the record of the case in the Patent Office.

Signed and sealed this 26th day of February, A. D. 1946.

Leslie Frazer (Seal)   First Assistant Commissioner of Patents.

fore it is resubmerged in the body of concentrate, readily blends with the body of concentrate as the coil moves through it. This prevents the formation of any heavy film of overconcentrated deposit on the coil. Furthermore, the movement of the coil through the body of concentrate agitates it and keeps its composition substantially uniform.

The concentrate may be drawn off through the outlet 25 while hot or after cooling it may be dug out of the bottom of the evaporator or scraped through a suitable opening in the side.

This concentrate contains valuable food stuffs including levulose, sugar, etc. It has a good, scorch-free flavor. It is readily converted into a food stuff which is more easily handled by adding to it a dry material which absorbs the liquid of the concentrate and blends with it to form a homogeneous mass of lower moisture content which is solid and is preferably of such low water content that it is free from objectionable tackiness. A confection may readily be made by adding powdered milk (either skimmed or whole milk) in any suitable amount. The concentrate and powdered milk may be mixed in equal amounts on the amount of milk may be half the amount of concentrate or may be twice the amount of concentrate. The quantity of milk added will depend upon the solids content of the concentrate and the moisture content desired in the finished product. Eggs, in powdered form, may be added to enrich the product. Nuts, raisins, chocolate, cocoa, etc. may be added to make a fancy candy but this is not necessary. Cooking the concentrate and powdered milk gives an "off" flavor to the product which can be avoided by mixing the concentrate and powdered milk without cooking them. To do this the concentrate may be heated to a temperature not over 212° F. to make it liquid and the powdered milk may be gradually stirred into it. The milk may advantageously be heated before being added to the concentrate so as not to chill it, or heat may be supplied to the concentrate as the powdered milk is stirred into it.

I claim:

1. The method of concentrating apple juice to produce a concentrate with a solids content of over seventy-five percent which comprises rotating a coil partially submerged therein on a horizontal axis, maintaining the temperature of the coil at about 190° F. and circulating air over the unsubmerged portion of the coil to hasten the evaporation of moisture from juice which adheres to the coil and rotating the coil at such a speed that no over-concentrated deposit forms on the coil.

2. The method of concentrating apple juice which comprises rotating a coil partially submerged therein on a horizontal axis, maintaining the temperature of the coil at about 190° F. and circulating air over the unsubmerged portion of the coil to hasten the evaporation of moisture from juice which adheres to the coil and rotating the coil at such a speed that no over-concentrated deposit forms on the coil and thus continuing the evaporation of water from the juice until it reaches a solids content of over seventy-five per cent.

3. The method of producing a concentrate from apple juice which comprises liming the juice and then concentrating the juice by dipping a heated surface into a body of the juice, removing it therefrom, circulating air around the heated surface while not submerged in the body of the juice to hasten evaporation of water therefrom, then moving the heated surface through the body of the juice to agitate the body of the juice and disperse the concentrated film on the surface with the body of the juice, then removing the heated surface and repeating the operation until the concentration of the body of the juice exceeds a solids content of seventy-five per cent and preventing scorching by not heating the surface to a temperature in excess of 212° F.

RAY M. LAIRD.

CERTIFICATE OF CORRECTION.

Patent No. 2,392,093. January 1, 1946.

RAY M. LAIRD.

It is hereby certified that error appears in the printed specification of the above numbered patent requiring correction as follows: Page 1, first column, line 50, for "holow" read --hollow--; page 2, first column, line 26, for "on" after "amounts" read --or--; and that the said Letters Patent should be read with this correction therein that the same may conform to the record of the case in the Patent Office.

Signed and sealed this 26th day of February, A. D. 1946.

Leslie Frazer
(Seal) First Assistant Commissioner of Patents.